June 9, 1942.  O. L. HALSTEAD  2,285,965

WHEEL GAUGE

Filed Oct. 22, 1941

INVENTOR.
OWEN L. HALSTEAD
BY
ATTORNEYS.

Patented June 9, 1942

2,285,965

UNITED STATES PATENT OFFICE 2,285,965

WHEEL GAUGE

Owen L. Halstead, Middlefield, Ohio

Application October 22, 1941, Serial No. 416,060

8 Claims. (Cl. 33—203)

This invention is a wheel gauge for determining whether a wheel to which it is attached rotates in the desired plane, as in a vertical plane, with the view of correcting any deviation therefrom. It is intended especially for testing vehicle wheels, and more particularly the front wheels of automotive vehicles incorporating knee action.

The primary object of the invention is to provide an exceedingly simple and inexpensive yet thoroughly reliable wheel gauge that may be quickly and conveniently attached to a wheel and that will, by the simple act of turning the wheel, or, in the case of a vehicle wheel, by propelling the vehicle over a level surface a distance corresponding to the circumference of the wheel, indicate whether the wheel rotates in the desired plane, as in a true vertical plane, and if not, where, in the circumference of the wheel, the deviation from such plane is greatest.

Being quick and convenient of attachment and detachment, the gauge may be removed, in case the nature of the adjustment requires it, and the wheel adjusted in the usual way and then replaced for further test, and so on, until the wheel runs true; and it is a further object to provide a relatively light but rugged structure in order to facilitate handling and at the same time withstand the rough usage to which an instrument of this sort is liable to be subjected in the average garage.

A further object is to provide a recording gauge by which a record may be made of a wheel's condition with regard to the factors involved.

Figure 5:
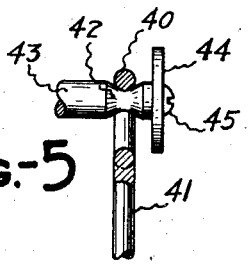
Figure 2:
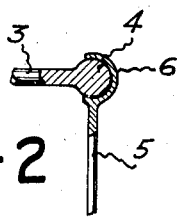
Figure 1:
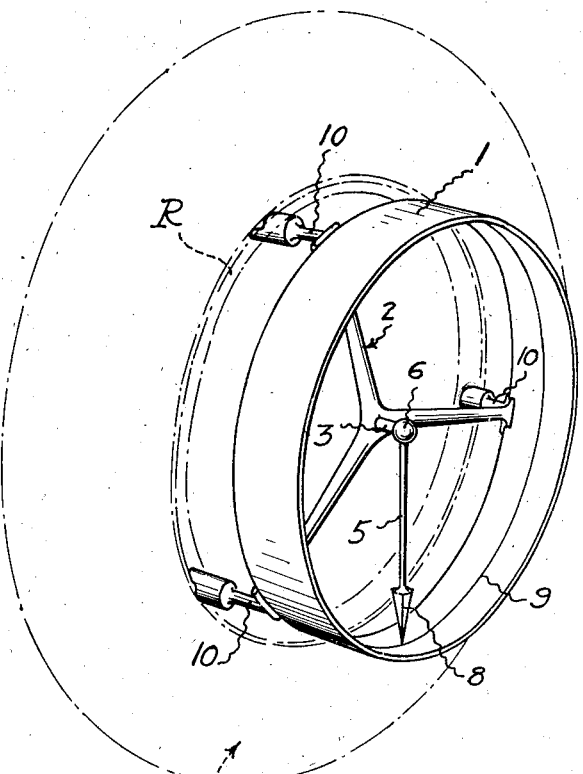
Figure 4:
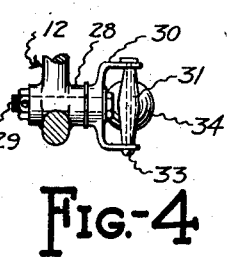
Figure 3:
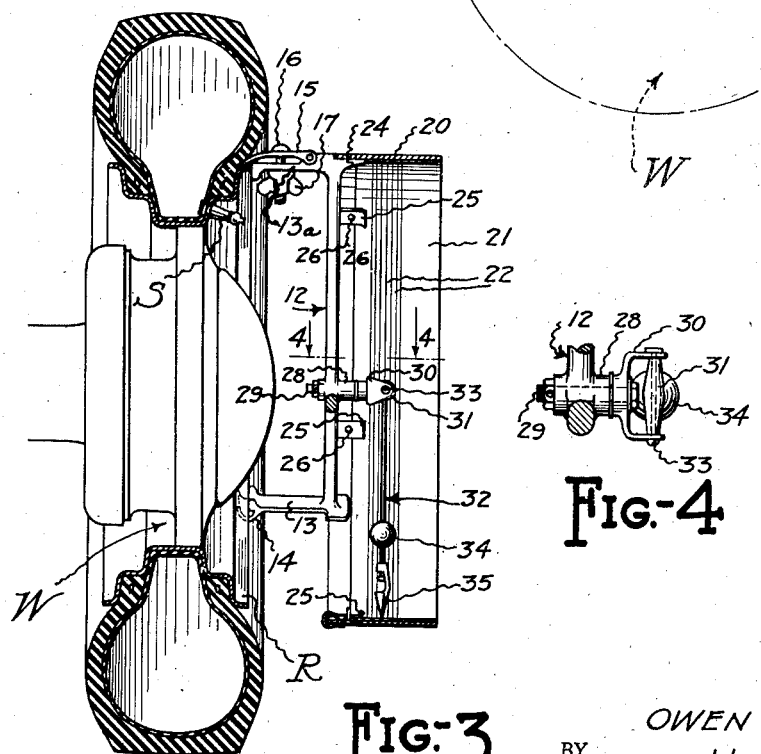

Other objects and advantages will appear as I proceed to describe the invention by reference to the accompanying drawing wherein Fig. 1 is a perspective view of a gauge constructed in accordance with the invention and applied to a vehicle wheel indicated in dot-and-dash lines; Fig. 2 is a detail of the swivel connection between the pendulum and the mounting therefor employed in the construction shown in Fig. 1; Fig. 3 is a vertical section through another form of the invention attached to a vehicle wheel that is shown partly in section; Fig. 4 is a sectional detail on the line 4—4 of Fig. 4, and Fig. 5 shows a simplified form of the connection between the pendulum and its mounting that is applicable to either form of the invention.

According to the embodiment illustrated in Figs. 1 and 2, the gauge includes a scale 1 in the form of a ring or drum that is desirably made of relatively light weight metal, such as aluminum, although it may be made of steel, plastic, or other materials. Secured to the scale 1, preferably adjacent what may be regarded its inner edge, is a supporting structure designated generally by the numeral 2 and shown in the form of a three-spoke spider from the central portion of which a spindle 3 projects. The spindle terminates in a spherical head or ball 4 (Fig. 2) that is accurately centered within the ring-like scale 1 and is disposed in a plane about midway between the inner and outer edges of the scale.

A pendulum 5 is swiveled to the head 4 that constitutes its mounting as by having the socketed upper end 6 of the pendulum formed loosely about said head so as to be freely movable with respect thereto in all directions within a liberal range, the wall of the socket embracing enough more than half the spherical head 4 to insure against the pendulum becoming disconnected from its mounting. The pendulum incorporates an index device or pointer 8 that cooperates with one or more circumferential gauge lines on the inner side of the scale 1, there being one such line shown at 9 in the embodiment at present under consideration.

Extending in an axial direction from the inner side of the structure above described, desirably from the ends of the spokes of the spider that constitutes the supporting structure 2, are arms 10 that are shown as enlarged at their outer ends and as having their end faces shaped to fit the edge portion of the rim R of a wheel that is designated generally by the reference letter W. The arms 10 are rigidly connected to the scale 1 and the portions of their end faces that are intended for contact with the edge of the rim R are in a plane precisely parallel to that of the gauge line 9. The arms, according to my present preference, are magnetized so as to constitute thereof permanent magnets which attach themselves firmly to the steel rim of the wheel when presented thereto.

When using the form of the invention above described to test a vehicle wheel, the instrument is applied to the wheel as shown and the vehicle driven over a level surface, as an area of a garage floor that is especially prepared for or suited to the purpose, a distance corresponding to the diameter of the wheel, and by observing, as the operation progresses, the relation of the index pointer 8 to the line 9, the angular relation of the rotating plane of the wheel to an absolutely vertical plane may be ascertained. If the wheel is not rotating in a true vertical plane, or in a plane in proper relation to its mounting, the pendulum will indicate with reference to the aforesaid line where the greatest deviation from such plane occurs, and the wheel may be marked in that region for correction. If the nature of the adjustment is such as would necessitate removal of the gauge, the gauge may be jerked from the wheel and laid aside and the wheel adjusted and thereafter the gauge reapplied in the manner above explained and a further reading taken.

In the form of the invention illustrated in Figs. 3 and 4, a supporting structure 12, desirably like that designated 2 of the previous form, incorporates rigid arms 13 and 13ª, there preferably being two of the former and one of the latter, spaced approximately 120° apart according to the spacing of the spokes of the spider-like structure 12. The arms 13 have hook-like extensions 14 that are adapted to be engaged over the flange of the rim R, when the end faces of all arms are in contact with the edge of said rim, and associated with the arm 13ª is a pivoted jaw 15 that is adapted to be projected over the edge of the rim and drawn toward the arm 13ª by a bolt 16 to which a wing nut 17 is applied. Sustained by the spider-like supporting structure 12 is a ring or scale 20 which, if it is to serve as a scale, has one or more gauge lines (not shown) inscribed on its inner surface, as in the case of the scale 1 of the previously described embodiment.

In addition to the gauge lines that may be permanently inscribed on the inner side of the ring 20, or in lieu thereof, a chart 21, of paper or the like, having gauge lines 22 thereon, may be removably applied to the inner side of the ring 20, the ends of the strip that constitutes the chart abutting adjacent the arm 13ª. The ends of the chart are notched to accommodate a positioning lug 24 that serves to indicate the place on the ring 20 where the ends of the chart are to be brought together, and the chart is desirably held to the ring by spring clips 25 that may be welded to the ring or held in place thereon by pins 26 that are carried by and project inwardly from the ring 20 and are engaged through holes in the inner jaws of the clips. The pins 26 serve as abutments against which the inner edge of the chart is engaged to dispose the central gauge line thereof in proper or parallel relation to the plane of the rim engaging end faces of the arms 13, 13ª. Mounted in a central boss 28 of the supporting structure or spider 12 is a bolt 29 on the forward end of which is pivoted a yoke 30 between the branches of which a T-head 31 of a pendulum 32 is pivoted on a cross pin 33 that is supported by and between the arms of the yoke. The pendulum incorporates a weight 34 and therebelow has movably attached to it a stylus or marker 35 which may carry or contain a suitable marking material or fluid, and which inscribes a line on the chart 21 as the wheel rotates. In the absence of the chart 21, the gauge lines are inscribed on the inner surface of the ring 20 so as to constitute thereof a scale, in which case the pendulum 32 is provided with a suitable index pointer or device, such as that designated 8 in the previously described form of the invention. As will be readily understood, universal movement is afforded the pendulum 32 by reason of the nature of its connection with the supporting structure 12.

In the use of this form of the invention, the hooks 14 of the arms 13 are engaged over the edge portion of the rim R with the end faces of all arms in contact with the edge of the rim. The jaw 15 on the arm 13ª is then hooked over the edge of the rim and drawn down tightly by means of the bolt 16 and nut 17. If the instrument is a recording gauge involving the replaceable chart 21, care should be taken to position the instrument in a definite orientated position with respect to the wheel, and this may be readily accomplished by placing the arm 13ª, adjacent which is located the chart positioning lug 24, in substantially radial alignment with the valve stem S. With the chart 21 accurately placed within the ring 20, in the manner previously described, and with marking material or fluid in the stylus or marker 35, the wheel is rotated, as by driving the vehicle across a level floor a distance corresponding to the diameter of the wheel, and in so doing, a line will be inscribed on the chart in a relation to the gauge line or lines 22 thereon that will give a permanent record of the condition of the wheel with regard to its plane of rotation.

As a substitute for the above described swivel connections between the pendulums and their mountings, the simple and inexpensive construction shown in Fig. 5 may be employed which consists of a ring 40 on the upper end of the pendulum stem 41 that bears in a groove 42 of the spindle or mounting 43; and to prevent the ring from being dislodged from the spindle or mounting, a disk 44, larger than the opening in the ring 40, is secured, as by a screw 45, to the end of the spindle or mounting.

Although I have illustrated the scale 1 and ring 2 as being cylindrical, it is within the contemplation of my invention to make either or both of them, or as least the inner surfaces thereof, transversely concaved on an arc which has as its center the pivotal mounting of the pendulum so that the index pointer of the pendulum will be uniformly spaced from the inner surface of the scale throughout its lateral movement relative thereto.

While I have shown, and described in detail, certain structures incorporating my improvements, it will be understood that the invention is susceptible to various other modifications, wherefore I do not limit myself to the details herein disclosed further than required by the terms of the claims appended hereto.

Having thus described my invention, what I claim is:

1. A wheel gauge comprising a supporting structure including a pendulum mounting, means for attaching said structure to the rim of a wheel so that the structure rotates with the wheel, a pendulum swiveled to said mounting and incorporating an index device, and an annular scale carried by the supporting structure in concentric relation to the pivotal axis of the pendulum and in operative relation to said device.

2. A wheel gauge comprising a supporting structure including a pendulum mounting, means for attaching said structure to the rim of a wheel so that the structure rotates with the wheel, a pendulum swiveled to said mounting to hang in a vertical position therefrom, and a ring-like scale carried by the supporting structure in substantially concentric relation to the rotating axis of the wheel, the pendulum incorporating an index device cooperating with said scale.

3. A wheel gauge comprising a supporting structure including a pendulum mounting, means for attaching said structure to the rim of a wheel so that the structure will rotate with the wheel and so that the axis of the pendulum mounting is coincident with the turning axis of the wheel, a ring-like scale carried by the supporting structure in concentric relation to the axis of the pendulum mounting, the same being provided with one or more gauge lines, and a pendulum swiveled to the mounting and incorporating an index device which reposes in closely spaced relation to the inner side of said scale.

4. A wheel gauge comprising a supporting structure including a pendulum mounting, means for attaching said structure to the rim of a wheel so that the structure will rotate with the wheel and so that the axis of said mounting is coincident with the turning axis of the wheel, a ring-like scale carried by the supporting structure in substantially concentric relation to the axis of the pendulum mounting, said scale bearing on its interior one or more gauge lines that are disposed in a plane parallel to that of the rim of the wheel when the structure is applied thereto, and a pendulum swiveled to said mounting and incorporating an index device that is disposed by gravity in operative relation to the scale.

5. A wheel gauge comprising a supporting structure including a pendulum mountin, magnetic means for attaching said structure to the rim of a wheel so that the structure will rotate with the wheel, a scale carried by the supporting structure, and a pendulum swiveled to said mounting and incorporating an index device that is disposed by gravity in operative relation to the scale.

6. A wheel gauge comprising a supporting structure including a pendulum mounting, a ring-like scale carried by the supporting structure in substantially concentric relation to the axis of said mounting, a pendulum swiveled to said mounting and incorporating an index device that is disposed by gravity in operative relation to the scale, and means for attaching said structure to the rim of a wheel so that the structure will rotate with the wheel, said means consisting of a plurality of arms having end faces for engagement with the rim and consisting of permanent magnets whereby through magnetic attraction they attach themselves to the rim.

7. A wheel gauge comprising a supporting structure including a pendulum mounting, a scale carried by the supporting structure, a pendulum swiveled to said mounting and incorporating an index device that is disposed by gravity in operative relation to the scale, and means for attaching said structure to the rim of a wheel so that the structure will rotate with the wheel, said means consisting of a plurality of arms extending in an axial direction from the inner side of the supporting structure and having end faces for engagement with the rim of the wheel, certain of said arms having hooks for embracing the edge portion of the rim, a jaw pivoted to another of said arms for engagement over the edge of the rim, and means for operating said jaw to clamp the structure to the rim.

8. A wheel gauge comprising a supporting structure including a pendulum mounting, means for attaching said structure to the rim of a wheel so that the structure will rotate with the wheel, a ring carried by the supporting structure in concentric relation to the axis of the pendulum mounting, a chart applied to the inner side of said ring and having one or more gauge lines thereon, means properly positioning the chart on, and removably attaching it to, the ring, a pendulum swiveled to the aforesaid mounting, and a marking device movably connected to the pendulum and bearing upon said chart for inscribing a line thereon when the wheel is rotated.

OWEN L. HALSTEAD.